US012253037B2

(12) United States Patent
Won et al.

(10) Patent No.: US 12,253,037 B2
(45) Date of Patent: Mar. 18, 2025

(54) METHOD OF HEATING CATALYST THROUGH SYSTEM COOPERATION AND VEHICLE

(71) Applicants: HYUNDAI MOTOR COMPANY, Seoul (KR); KIA CORPORATION, Seoul (KR)

(72) Inventors: Doo-Il Won, Seoul (KR); Oh-Jae Lee, Seoul (KR); Naeun Jung, Seoul (KR); Dong-Woo Hong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/367,110

(22) Filed: Sep. 12, 2023

(65) Prior Publication Data

US 2024/0093654 A1 Mar. 21, 2024

(30) Foreign Application Priority Data

Sep. 13, 2022 (KR) ........................ 10-2022-0115070

(51) Int. Cl.
*F02D 41/02* (2006.01)

(52) U.S. Cl.
CPC .... *F02D 41/024* (2013.01); *F02D 2200/0802* (2013.01); *F02D 2200/50* (2013.01)

(58) Field of Classification Search
CPC ...... F02D 41/024; F02D 41/021; F02D 41/06; F02D 41/062; F02D 41/08; F02D 41/1494; F02D 2200/0802; F02D 2200/50; F02D 2200/101; F02D 2200/501; F02D 2200/10; F01N 9/00; F01N 3/2013; F01N 2560/025; F02N 11/0814; B60W 10/06; B60W 20/16; B60W 40/105; B60W 2510/0657; B60W 2510/083; B60W 2510/10; B60Y 2200/92
See application file for complete search history.

(56) References Cited

U.S. PATENT DOCUMENTS

| | | | | |
|---|---|---|---|---|
| 5,490,381 A * | 2/1996 | Becker | F01N 11/002 | |
| | | | 60/284 | |
| 5,709,198 A * | 1/1998 | Sagisaka | F02D 41/1494 | |
| | | | 123/685 | |

(Continued)

FOREIGN PATENT DOCUMENTS

JP 2013-189900 A 9/2013

*Primary Examiner* — Dapinder Singh
(74) *Attorney, Agent, or Firm* — MCDONNELL BOEHNEN HULBERT & BERGHOFF LLP

(57) ABSTRACT

A method of heating catalyst through system cooperation implemented by a vehicle may enable the start of an engine of a part load among engine operation modes to heat a catalyst even in a cold quick acceleration situation with a lock-up CH control by locking up an engine clutch through system cooperation implemented by mutually exchanging information between controllers of an engine management system (EMS) and a hybrid control unit (HCU) by applying a lock-up CH control logic which retards a lock-up CH ignition angle compared to an idle CH control logic of the conventional method, thereby improving the regulation responsiveness, fuel efficiency, and merchantability relatively compared to the idle CH even while having the advantages of the idle CH in which quick lambda feedback control for an engine is possible.

11 Claims, 3 Drawing Sheets

(56) References Cited

U.S. PATENT DOCUMENTS

| | | | | |
|---|---|---|---|---|
| 9,631,528 | B2 * | 4/2017 | Bradley | F01N 3/00 |
| 9,658,200 | B2 * | 5/2017 | Jin | G01N 33/0075 |
| 10,934,920 | B2 * | 3/2021 | Hirooka | F01N 3/103 |
| 2003/0172643 | A1 * | 9/2003 | Suzuki | B60K 6/48 903/905 |
| 2015/0047348 | A1 | 2/2015 | Osumi | |
| 2019/0242316 | A1 * | 8/2019 | Dudar | F02D 41/0007 |
| 2019/0271253 | A1 * | 9/2019 | Hirooka | B60W 20/16 |
| 2019/0285017 | A1 * | 9/2019 | Dudar | F02D 41/064 |
| 2020/0191083 | A1 * | 6/2020 | Glugla | F02D 41/1454 |
| 2023/0167780 | A1 * | 6/2023 | Haranahalli Panchakshari | F02D 41/1494 123/697 |

* cited by examiner

METHOD OF HEATING CATALYST THROUGH SYSTEM COOPERATION AND VEHICLE

CROSS REFERENCE TO RELATED APPLICATIONS

This application claims priority to Korean Patent Application No. 10-2022-0115070, filed on Sep. 13, 2022, which is incorporated herein by reference in its entirety.

BACKGROUND

Field of the Disclosure

The present disclosure relates to a method of heating a catalyst, and particularly, to a vehicle in which catalyst heating control is performed by mutually exchanging information between controllers through system cooperation.

Description of Related Art

In general, vehicles are equipped with a catalyst system configured to collect and remove particulate matters (PM), emissions (EM), nitrogen oxides ($NOx/NO/NO_2$), carbon monoxide (CO), and the like of exhaust gas, and the catalyst system removes NOx by reducing action of urea or removes soot by burning.

In particular, the catalyst requires a catalyst activation temperature of a certain temperature or higher (e.g., about 200° C. or higher) to decrease nitrogen oxides, and to this end, catalyst heating (CH) (hereinafter referred to as "CH") is performed.

For example, a logic of idle catalyst heating (hereinafter referred to as "idle CH") among strategies of the catalyst heating (CH) is a method of heating the catalyst through the idle of an engine in a state in which a vehicle speed is generated by only a drive motor and is suitable for a hybrid electric vehicle (HEV) and a plug-in hybrid electric vehicle (PHEV), which are vehicles having parallel structural characteristics of an engine and a motor which may generate the vehicle speed by only the drive motor among eco-friendly vehicles.

Therefore, in the parallel-type HEV vehicle, a light off time (LOT) (e.g., a time to reach 350° C.), which is a catalytic reaction time of a three-way catalyst, through the idle CH performed in the engine idle state before an engine clutch lock-up may be decreased, quick lambda feedback control is possible by operating the engine after preheating of a front oxygen sensor, it is relatively easy to find an optimal operating condition, and the adverse effect of exhaust gas due to disturbance can be minimized.

However, the HEV inevitably has various limitations in performing the idle CH.

For example, in the case of the idle CH, the HEV travels by only the drive motor during catalyst heating, a relatively large amount of engine driving energy is wasted, and the waste of engine energy adversely affects cold power performance and fuel efficiency.

In particular, the idle CH may be executed only under a slow acceleration condition in which the vehicle may drive with only the drive motor, and thus there is a limitation that the clutch lockup is unavoidable in cold quick acceleration situations, including a "quick drive away" condition in which the vehicle may not drive with only the drive motor.

Moreover, Table 1 shows emission gas regulations in the cold quick acceleration situation.

TABLE 1

Emission limit
The same regulation is applied regardless of strengthening regulatory values and environmental condition
Addition of new regulatory materials (NH3, CH4, N2O), strengthening PN regulation (MPI, 10 to 23 nm included)

| Unit: mg/km | | Test cycle | NO*x* | PN | CO | THC | NMOG | NH3 |
|---|---|---|---|---|---|---|---|---|
| EU6d | RDE | RDE (city 16 km) | 60 | 6E11(23 nm) | — | — | | — |
| | 23° C. | WLTC (23 km) | 60 | 6E11(23 nm) | 1,000 | 100 | 68 | — |
| | −7° C. | ECE(4 km) | — | — | 15,000 | 1,800 | — | — |
| Euro7 | Reference | RDE | 30 | 1E11(10 nm) | 400 | — | 45 | 10 |

* RDE: real driving emission, WLTC: worldwide harmonized light duty driving test cycle From Table 1, EURO 7 requires a catalyst heating technique of helping the quick activation of the catalyst by scheduling emission gas regulations in the cold quick acceleration situation to which it is difficult to respond with the conventional idle CH.

SUMMARY

Therefore, an object of the present disclosure considering the above point is to provide a method of heating a catalyst through system cooperation, which may perform catalyst heating even in a cold quick acceleration situation by locking up an engine clutch together with the start of an engine of a part load in an engine operation mode through system cooperation by mutually exchanging information between an engine management system (EMS) and a hybrid control unit (HCU) and in particular, relatively improve the regulation responsiveness, fuel efficiency, and merchantability even while having the advantages of idle catalyst heating (CH) in which quick lambda feedback control is possible, and a vehicle.

In accordance with one aspect of the present disclosure, a method of heating a catalyst through system cooperation includes an engine start request operation of transmitting, by an engine management system (EMS), a bit when preheating of an oxygen sensor is required and when an engine torque is required in a catalyst heating (CH) environmental condition, an engine start operation step of determining an engine start permission timing, by a hybrid control unit (HCU), using the bit and transmitting an engine load operation (lock-up CH) mode command whereas changing a transmitting command to an engine no-load operation (idle CH) mode command in the case of being not bit=1, and an engine driving operation of operating, the EMS, the engine with the engine load operation mode command or the engine no-load operation mode command.

In an embodiment, the EMS and the HCU may transmit and receive the bit and the commands through controller area network (CAN) communication.

In an embodiment, the CH environmental condition may be determined as a quick drive away state or a cold quick acceleration state of a vehicle.

In an embodiment, the bit may be classified into a lock-up CH bit according to the need of the preheating and an engine start enable bit according to the need of the engine torque, the determination of the lock-up CH bit may apply a state in which the oxygen sensor does not reach an activation temperature as a preheating available condition and the lock-up CH bit may be generated when reaching the activation temperature according to the completion of the preheating, whereas the determination of the engine start enable bit may apply a vehicle speed condition requiring an engine torque together with a motor torque in a preheating unavailable condition and the engine start enable bit may be generated when reaching a vehicle speed according to the vehicle condition.

In an embodiment, the determining of the engine start permission timing may apply a lock-up CH bit according to the need of the preheating among the bits, and the lock-up CH bit may be transmitted by the EMS to the HCU in a state of bit=1.

In an embodiment, in the performing of the engine load operation (lock-up CH) mode, in the case of bit=1, an engine load operation mode condition may be determined by confirming a shift stage and demand power to determine a part load of the engine as a part load (PL) CH demand torque, a part load state together with the PL CH demand torque may be transmitted to the EMS, and the demand power may be an engine torque to assist vehicle power all handled by a drive motor.

In an embodiment, the engine load operation (lock-up CH) mode command may be performed by lock-up CH control in which the EMS operates the engine and fastens a clutch with the engine, the lock-up CH control may operate the engine with the retardation of an ignition angle, and the retardation of the ignition angle may be until a time point when the clutch is locked up.

In an embodiment, the engine no-load operation (idle CH) mode command may be performed by idle CH control in which the EMS operates the engine, and the engine may idle without being fastened to the clutch.

In addition, in accordance with another aspect of the present disclosure, a vehicle includes a catalyst heating system configured to preheat an oxygen sensor provided at a front end of catalyst, wherein the catalyst heating system includes an engine management system (EMS) configured to transmit a lock-up CH bit according to preheating of the oxygen sensor and an engine start enable bit according to the need of an engine torque in a catalyst heating (CH) environmental condition and perform an engine load operation mode command or an engine no-load operation mode command, a hybrid control unit (HCU) configured to transmit the engine load operation (lock-up CH) mode command in which the lock-up CH bit is confirmed and in the case of bit=1, a clutch is locked up and an engine is operated to the ESM and transmit the engine no-load operation (idle CH) mode command in which the engine idles in the case of being not bit=1, and controller area network (CAN) communication configured to exchange data between the ESM and the HCU.

In an embodiment, the catalyst heating system may be applied to a hybrid electric vehicle (HEV) or a plug-in hybrid electric vehicle (PHEV) in which a drive motor is arranged in the engine in parallel.

In an embodiment, the EMS may retard an ignition angle of the engine until a time point when the clutch is locked up in the engine load operation mode command.

The catalyst heating control through system cooperation implemented by the vehicle of the present disclosure implements the following actions and effects.

First, it is possible to solve the execution limit condition of the catalyst heating control of the HEV/PHEV through the lock-up CH strategy in contrast to the conventional idle CH strategy for catalyst heating. Second, the EMS and HCU of the HEV/PHEV can perform catalyst heating while traveling in the part load mode among the engine operation modes as well as in the cold quick acceleration situation in which the HEV/PHEV may not travel with only the drive motor by locking up the engine clutch together with the start of the engine through the strategy of the lock-up CH. Third, the quick lambda feedback control can also be implemented in the lock-up CH like the idle CH by operating the engine after preheating of the front oxygen sensor. Fourth, the time to reach the LOT of 350° C. and the time to reach the catalyst purification efficiency of 90% can be decreased by about half compared to the idle CH through the lock-up CH. Fifth, it is possible to relatively, significantly improve the regulation responsiveness to EURO7, fuel efficiency, and merchantability with the lock-up CH in the future compared to the idle CH.

DETAILED DESCRIPTION

Hereinafter, an embodiment of the present disclosure will be described in detail with reference to the accompanying exemplary drawings, and the embodiment may be implemented in various different forms by those skilled in the art to which the present disclosure pertains and thus is not limited to the embodiment described herein.

Figure 1:
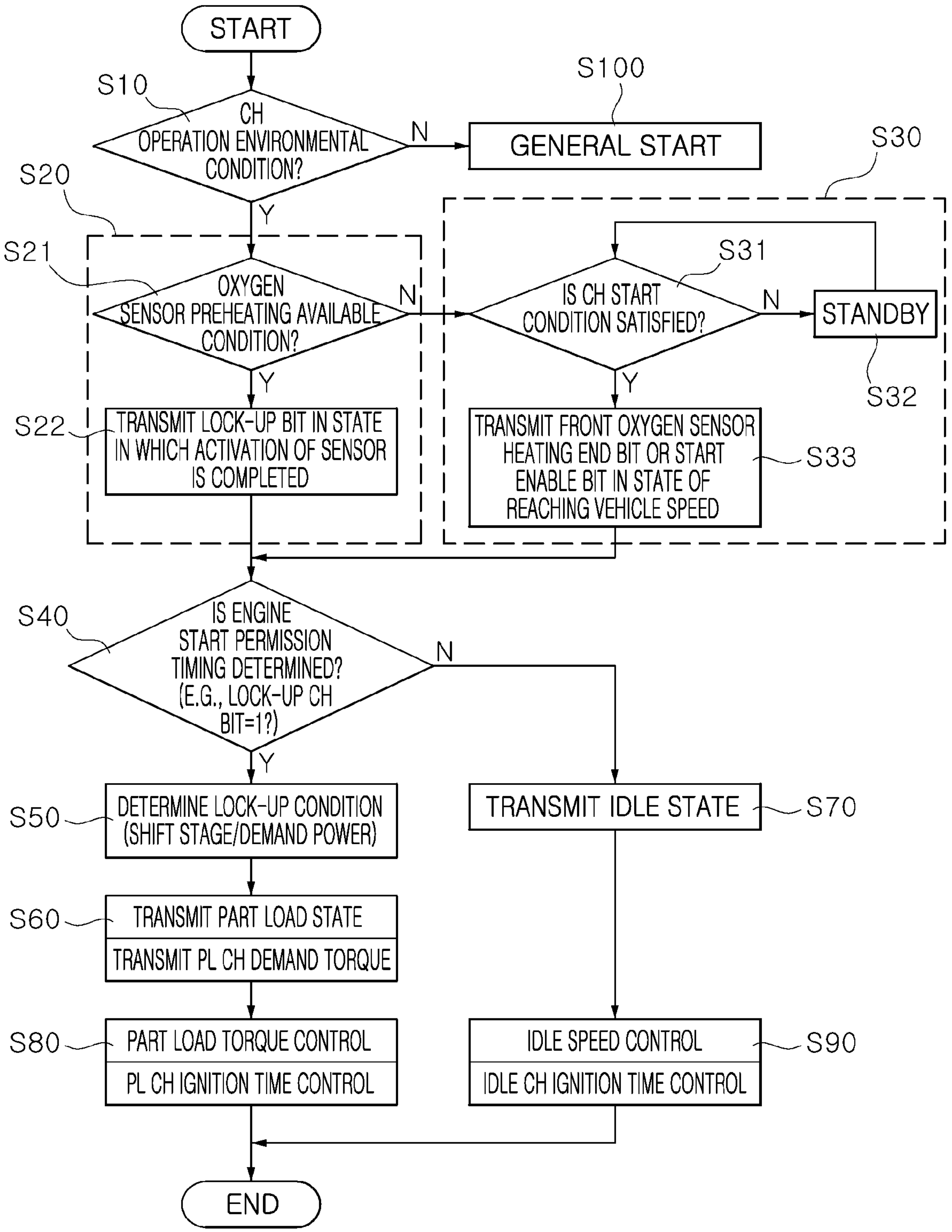
FIG. 1 is a flowchart of a method of heating catalyst through system cooperation according to an embodiment.

Referring to FIG. 1, a method of heating a catalyst through system cooperation includes an operation of request the start of an engine (S10 to S30) including an operation of determining a catalyst heating (CH) environmental condition (S10) and an operation of determining system cooperation (S20 and S30), an operation of approving the start of the engine (S40 to S70) including an operation of transmitting an engine load operation mode (e.g., lock-up CH) command (S50 and S60) or an operation of transmitting an engine no-load operation mode (e.g., idle CH) command (S70), and an operation of driving the engine (S80 and S90) including a lock-up CH control (S80) or an idle CH control (S90). In this case, S10, S20, S30, S80, and S90 are performed by an engine management system (EMS) 20 (see FIG. 2), and S40, S50, S60, and S70 are performed by a hybrid control unit (HCU) 30 (see FIG. 2), and data is transmitted and received therebetween through controller area network (CAN) communication 40 (see FIG. 2).

Therefore, the method of heating the catalyst through system cooperation can overcome the limitations of the idle CH strategy by applying the lock-up CH as a main method and applying the idle CH as an assist method according to an engine condition as a catalyst heating strategy, and in particular, can have advantages for the regulation responsiveness, fuel efficiency, and merchantability relatively compared to the idle CH even while performing quick lambda feedback control through the start of the engine after preheating a front oxygen sensor like the idle CH by performing the catalyst heating with the lock-up CH strategy during the part load traveling by the lock-up of an engine clutch together with the start of the engine.

Figure 2:
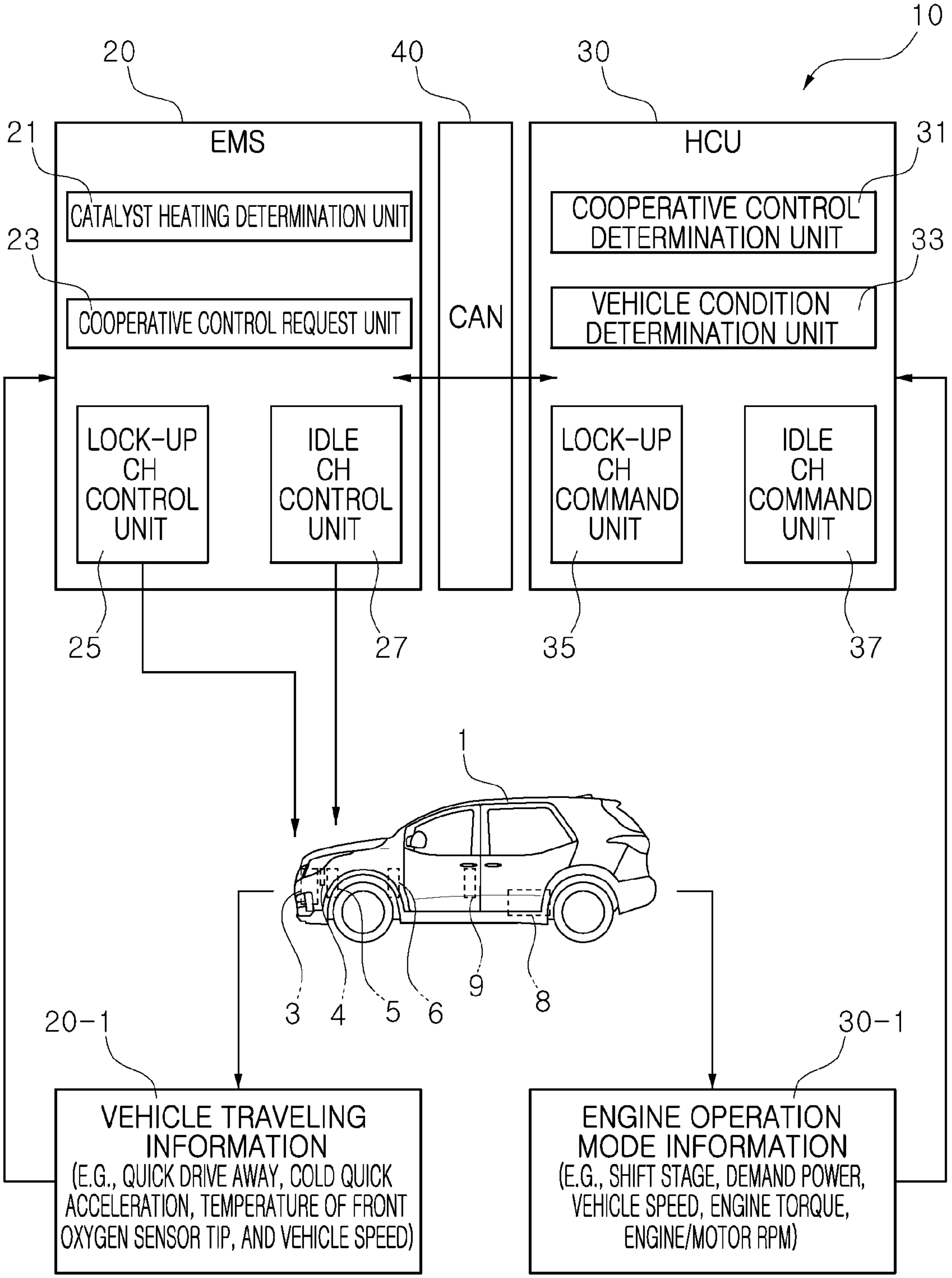
FIG. 2 is an example of a vehicle in which catalyst heating control through system cooperation according to the embodiment is performed.

Referring to FIG. 2, a catalyst heating system 10 is applied to a vehicle 1.

Specifically, the vehicle 1 includes an engine 3, a clutch 4, a drive motor 5, a transmission 6, a catalyst 8, and an oxygen sensor 9.

For example, the engine 3 and the drive motor 5 are power sources of the vehicle 1, the clutch 4 is an engine clutch and locked up by engagement and unlocked up by disengagement to selectively connect the engine 3 and the drive motor 5, and the transmission 6 receives power from the engine 3 and/or the drive motor 5 and changes shift stages (e.g., P, N, D, and R) by operating a shift lever.

Therefore, the vehicle 1 is a parallel HEV/PHEV in which the engine 3 and the drive motor 5 have a parallel arrangement configuration. In addition, the engine 3, the clutch 4, the drive motor 5, and the transmission 6 constitute a power train and is controlled by any one of the engine management system (EMS) 20, the hybrid control unit (HCU) 30, and a transmission control unit (TCU) (not shown).

For example, when the catalyst 8 removes NOx by the reducing action of urea or removes soot by burning, the oxygen sensor 9 is a front oxygen sensor installed on an exhaust line at a front end of the catalyst 8 and detects an oxygen concentration in the catalyst or the exhaust gas at an inlet of the catalyst 8 and provides the detected oxygen concentration to the EMS 20 or the HCU 30. In this case, the catalyst 8 and the oxygen sensor 9 have a built-in heater (not shown) and are controlled by the EMS 20 or the HCU 30.

In particular, as the catalyst 8, a selective catalytic reduction (SCR), diesel particulate filter (DPF), catalyzed particulate filter (CPF), diesel oxidation catalyst (DOC), or the like may be used.

Specifically, the catalyst heating system 10 includes the EMS 20, the HCU 30, and the CAN communication 40.

For example, the EMS 20 is an engine controller and connected to a vehicle traveling information input unit 20-1, wherein the vehicle traveling information input unit 20-1 provides a quick drive away, cold quick acceleration, temperature of a front oxygen sensor tip, vehicle speed, and the like detected from a vehicle-equipped sensor of the vehicle 1 to the EMS 20 as vehicle traveling information. In this case, the vehicle-equipped sensor includes various sensors, such as a temperature sensor, a vehicle speed sensor, an accelerator pedal sensor, and a throttle sensor.

To this end, the EMS 20 includes a catalyst heating determination unit 21, a cooperative control request unit 23, a lock-up CH control unit 25, and an idle CH control unit 27, and functions of the components will be described below together with the method of heating the catalyst.

For example, the HCU 30 is a higher controller than the EMS 20 and the TCU and is connected to an engine operation mode information input unit 30-1, wherein the engine operation mode information input unit 30-1 provides a shift stage, desired power, vehicle speed, engine torque, motor torque, engine revolution per minute (RPM), motor RPM, and the like detected from the vehicle-equipped sensor to the HCU 30 as engine operation mode information. In this case, the RPM is revolution per minute.

To this end, the HCU 30 includes a cooperative control determination unit 31, a vehicle condition determination unit 33, a lock-up CH command unit 35, and an idle CH command unit 37, and functions of the components will be described below together with the method of heating the catalyst.

Specifically, the CAN communication 40 is a CAN applied to mutual communication between electronic control units (ECUs) of the vehicle 1 and exchanges data between the EMS 20 and the HCU 30.

Hereinafter, the method of heating the catalyst through system cooperation will be described in detail with reference to FIGS. 2 and 3. In this case, the control subject is the EMS 20 and/or the HCU 30, the control target is any one of the engine 3, the clutch 4, the drive motor 5, the catalyst 8, and the oxygen sensor 9, and CH refers to catalyst heating.

First, the EMS 20 starts the operation of determining the CH environmental condition (S10).

Referring to FIG. 2, the EMS 20 determines the CH environmental condition by confirming the quick drive away state or cold quick acceleration state of the vehicle 1 among the vehicle traveling information of the vehicle traveling information input unit 20-1 through the catalyst heating determination unit 21. In this case, the quick drive away state and the cold quick acceleration state are applied in a normal ambient condition of 0 to 30° C. or −7 to 35° C. and refer to a vehicle state in which the parallel HEV/PHEV type vehicle 1 may not travel with only the drive motor 5.

As a result, when the vehicle 1 is not in the CH environmental condition (S10), the EMS 20 ends the catalyst heating control through system cooperation by switching to a normal start (S100). In this case, the normal start (S100) refers to the operation of the engine 3 generated in a state in which the vehicle 1 may travel with only the drive motor 5.

On the other hand, the EMS 20 enters the operation of requesting the system cooperation control (S20 and S30) when the vehicle 1 is in the CH environmental condition (S10).

Subsequently, the operation of requesting the system cooperation control (S20 and S30) by the EMS 20 includes an operation of requesting the start of the engine after activating the oxygen sensor (S20) and an operation of requesting the start of the engine after reaching the vehicle speed (S30).

Referring to FIG. 2, the EMS 20 confirms the quick drive away, the cold quick acceleration, and the temperature of the front oxygen sensor tip among the vehicle traveling information of the vehicle traveling information input unit 20-1 through the catalyst heating determination unit 21 and thus performs the operation of requesting the start of the engine after activating the oxygen sensor (S20).

For example, the operation of requesting the start of the engine after activating the oxygen sensor (S20) includes an operation of confirming an oxygen sensor preheating available condition (S21) and an operation of generating a lock-up CH bit (S22).

Therefore, in the operation of confirming the oxygen sensor preheating available condition (S21), the oxygen sensor preheating available condition is confirmed depending on whether a temperature of the oxygen sensor 9 is lower than an activation temperature (e.g., 200° C. or 350° C.) through the temperature of the front oxygen sensor tip. In addition, in the operation of generating the lock-up CH bit (S22), the temperature of the front oxygen sensor tip increases to the activation temperature or higher by operating (i.e., preheating) a heater (not shown) provided in the oxygen sensor 9 through the EMS 20 or the HCU 30. In this case, reaching the activation temperature of the oxygen sensor 9 makes it possible to quickly implement the lambda feedback control according to engine combustion when the engine 3 is operated.

As a result, the EMS 20 generates lock-up CH bit=1 upon reaching the activation temperature of the oxygen sensor. At this time, the operation of the heater is terminated with the generation of the lock-up CH bit=1.

For example, the operation of requesting the start of the engine after reaching the vehicle speed (S30) includes an operation of confirming whether a CH start condition is satisfied (S31), an operation of waiting until reaching the vehicle speed (S32), and an operation of generating an engine start enable bit (S33).

Referring to FIG. 2, the EMS 20 confirms the temperature of the front oxygen sensor tip and the vehicle speed among the vehicle traveling information of the vehicle traveling information input unit 20-1 through the catalyst heating determination unit 21 and thus performs the operation of confirming whether the CH start condition is satisfied (S31) after reaching the vehicle speed.

Therefore, in the operation of confirming whether the CH start condition is satisfied (S31), a start time point of the engine 3 is determined through the vehicle speed in a state of not requiring the preheating of the oxygen sensor 9 as in the operation of confirming the oxygen sensor preheating unnecessary condition (S21) or the operation of reaching the oxygen sensor activation temperature (S22). In this case, the operation of waiting until reaching the vehicle speed (S32) is a standby state and refers to a vehicle speed at which an engine torque of the engine 3 is required together with a motor torque of the drive motor 5 to accelerate the vehicle 1.

As a result, in the operation of generating the engine start enable bit (S33), an engine start enable bit signal for operating the engine 3 is generated in a state in which the vehicle speed is considered. At this time, the EMS 20 may generate the engine start enable bit signal together with a front oxygen sensor heating bit end signal.

Referring to FIG. 2, the cooperative control request unit 23 of the EMS 20 transmits the lock-up CH bit=1 (S22) and the oxygen sensor heating bit end signal or the engine start enable bit signal (S33) to the cooperative control determination unit 31 of the HCU 30 through the CAN communication 40.

Meanwhile, the HCU 30 performs an operation of determining an engine start permission timing (S40) through the information received from the EMS 20.

Referring to FIG. 2, the HCU 30 receives the lock-up CH bit=1, oxygen sensor heating bit end signal, and/or engine start enable bit signal transmitted from the cooperative control request unit 23 of the EMS 20 through the CAN communication 40 and finally determines the start of the engine 3 by confirming lock-up CH bit=1 among the lock-up CH bit=1, the oxygen sensor heating bit end signal, and/or the engine start enable bit signal.

Therefore, the HCU 30 enters the operation of transmitting the engine load operation mode (e.g., the lock-up CH) command (S50 and S60) when the lock-up CH bit=1 is confirmed (S40) whereas switching to the operation of transmitting the engine no-load operation mode (e.g., the idle CH) command (S70) when the lock-up CH bit≠1 is confirmed.

For example, the operation of transmitting the engine load operation mode (e.g., the lock-up CH) command (S50 to S60) by the HCU 30 includes an operation of determining an engine load operation mode condition (S50) and an operation of determining the engine load operation mode (e.g., the lock-up CH) (S60).

Referring to FIG. 2, the HCU 30 confirms the engine operation mode information of the engine operation mode information input unit 30-1 through the vehicle condition determination unit 33 and confirms the shift stage and the vehicle desired power among the engine operation mode information.

Therefore, the operation of determining the engine load operation mode condition (S50) is performed from the shift stage and the desired power, wherein the shift stage is D (Drive), and the vehicle desired power is an engine torque to assist the vehicle power all handled by the drive motor 5. In this case, the shift stage and the vehicle desired power are determined from a shift map/vehicle speed map (not shown) of the HCU 30 based on the detected vehicle speed.

In addition, in the operation of determining the engine load operation mode (e.g., the lock-up CH) (S60), a part load catalyst heating (PL CH) desired torque is determined based on the part load state of the engine 3, and then the HCU 30 transmits part load state (PLS) command (PLS_command) and part load catalyst heating desired torque command (PLCHDT_command) signals based on the part load state through the lock-up CH command unit 35.

Thereafter, the lock-up CH control unit 25 of the EMS 20 performs a lock-up CH control (S80), and the lock-up CH control (S80) is performed by a lock-up CH control logic which performs the catalyst heating of the catalyst 8 by applying a part load catalyst heating ignition time to an ignition angle for the start of the engine 3 at the same time as controlling the RPM of the engine 3 with the part load torque to perform the ignition angle of the engine 3 with the retardation of the lock-up CH ignition angle. In this case, the EMS 20 retards the ignition angle of the engine 3 from the engine load operation mode command to a lock-up time point of the clutch 4.

On the other hand, in the operation of transmitting the engine no-load operation mode (e.g., the idle CH) command (S70), the HCU 30 switches to an engine idle state and transmits the idle CH control command to the idle CH control unit 27 of the EMS 20.

As a result, the idle CH control unit 27 of the EMS 20 performs the idle CH control (S90), and the idle CH control (S90) is performed by an idle CH control logic which performs the catalyst heating of the catalyst 8 by performing the ignition angle for the start of the engine 3 with the idle CH control ignition angle without RPM control by the part load torque of the engine 3. In this case, the idle CH control ignition angle of the idle CH control logic may retard an actual ignition angle compared to a base, but maintain a base ignition angle like a general engine operation state (i.e., a general engine start state).

Figure 3:
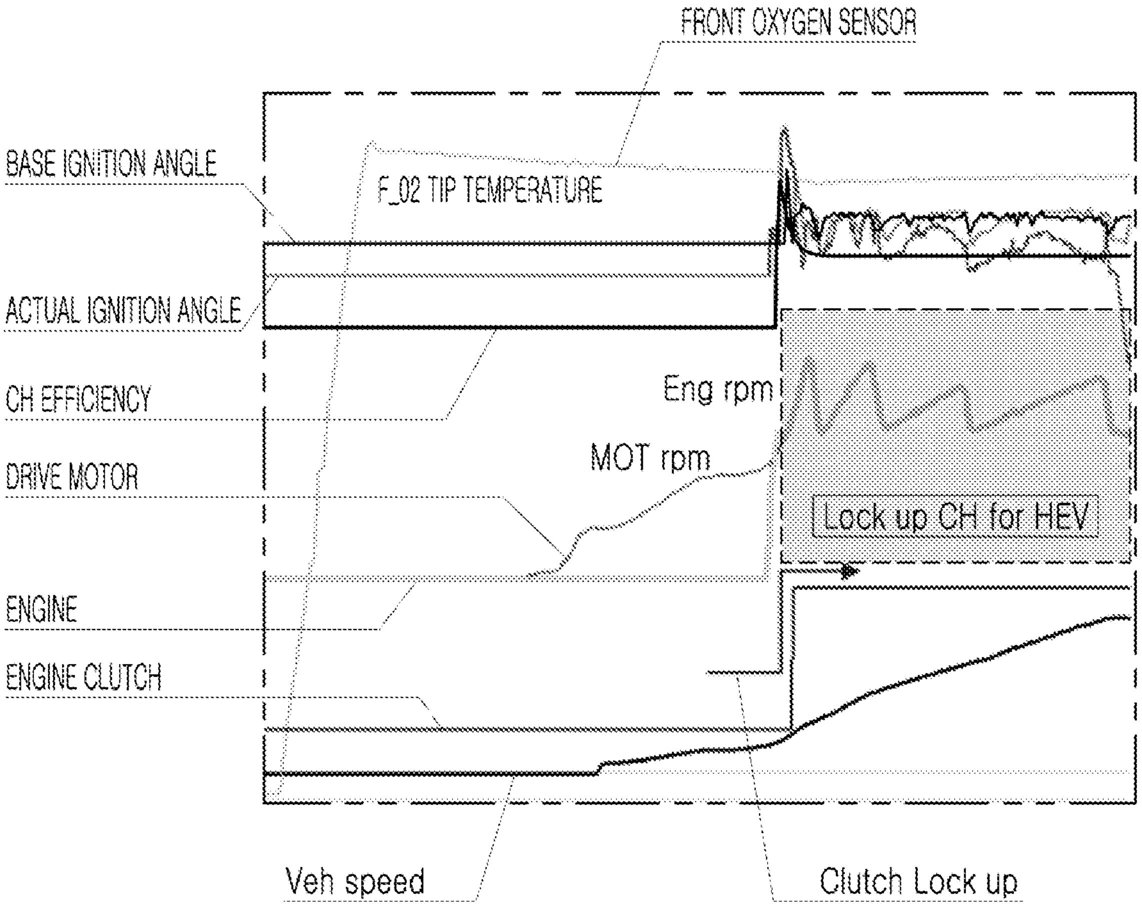
FIG. 3 is an experimental result of the catalyst heating control through system cooperation of a catalyst heating system according to the embodiment.

Meanwhile, FIG. 3 shows the experimental results according to the retardation of the lock-up CH ignition angle compared to the idle CH control logic of the conventional method of the lock-up CH control logic.

As shown, an $F\_O_2$ tip temperature (i.e., a sensor tip temperature) of the oxygen sensor 9 increases to a certain temperature or higher (e.g., 200° C. or higher or 350° C. or higher) through the preheating in the operation of confirming the oxygen sensor preheating available condition (S20) under the condition of the quick drive away or the cold quick acceleration.

For example, a Veh speed (i.e., a vehicle speed) of the vehicle 1 is gradually increased until an MOT RPM (i.e., a motor RPM) of the drive motor 5 reaches a predetermined RPM, and the engine 3 maintains a non-operation state until reaching the predetermined MOT RPM and then is switched to the operation state at a time point of the lock-up CH control (S80) and thus the clutch 4 is also switched to an engaged state (i.e., a clutch lock-up state).

In particular, the lock-up CH control (S80) replaces the actual ignition angle of the engine 3 with the retardation of the lock-up CH ignition angle compared to the base ignition angle.

As a result, the CH efficiency in the vehicle 1 of the parallel HEV/PHEV according to the catalyst heating strategy of the lock-up CH control logic is increased by about 2 times (e.g., 0.35→0.7) compared to the conventional idle CH.

In particular, the experimental results of the lock-up CH control logic prove the following excellent effects.

First, the lock-up CH can perform the quick lambda feedback control by starting the engine 3 after preheating the front oxygen sensor 9 like the idle CH with the catalyst heating during the part load traveling by locking up the engine clutch together with the start of the engine. Second, the light off time (LOT) of the catalyst 8 (in particular, the three-way catalyst) using a large amount of emission flow rates compared to the idle CH is decreased because the CH is performed during the part load traveling. Third, it is possible to minimize the decrease in cold power performance and improve fuel efficiency because the driving torque can be partially transmitted at the same time as performing the CH function. Fourth, since the fuel amount can be decreased by 12 ml in total because the idle fuel amount is not consumed through the lock-up CH, it is possible to improve the fuel efficiency by 0.22 to 0.6% and decrease the CH time by about 43% compared to the conventional CH time based on the same level of catalyst heating time point because the time to reach the LOT (350° C.) and the time to reach the catalyst purification efficiency of 90% are shortened by half compared to the conventional times, and fifth, compared to the idle CH, a degree of freedom of traveling is high and the catalyst activation time is short in the cold quick acceleration situation during the CH, which can be advantageous compared to the idle CH strategy in responding to new laws and regulations of ACC2 and EURO7.

As described above, the method of heating the catalyst through system cooperation implemented by the vehicle 1 according to the embodiment can enable the start of the engine of the part load among the engine operation modes to heat the catalyst 8 even in the cold quick acceleration situation with the lock-up CH control by locking up the engine clutch through system cooperation implemented by mutually exchanging information between the controllers of the EMS 20 and the HCU 30 by applying the lock-up CH control logic which retards the lock-up CH ignition angle compared to the idle CH control logic of the conventional method, thereby improving the regulation responsiveness, the fuel efficiency, and the merchantability relatively compared to the idle CH even while having the advantages of the idle CH in which the quick lambda feedback control for the engine 3 is possible.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A method of heating a catalyst through system cooperation, the method comprising:

transmitting, by an engine management system (EMS), a bit when preheating of an oxygen sensor is required and when an engine torque is required in a catalyst heating (CH) environmental condition;

when bit does not equal 1, determining an engine start permission timing, by a hybrid control unit (HCU), using the bit and transmitting an engine load operation (lock-up CH) mode command and changing a transmitting command to an engine no-load operation (idle CH) mode command; and operating, by the EMS, the engine with the engine load operation mode command or the engine no-load operation mode command;

wherein the bit is classified into a lock-up CH bit according to the need of the preheating of the oxygen sensor, and an engine start enable bit according to the need of the engine torque, wherein the determination of the lock-up CH bit applies a state in which the oxygen sensor does not reach an activation temperature as a preheating available condition, and the lock-up CH bit is generated when the preheating of the oxygen sensor is completed;

wherein the determination of the engine start enable bit applies a vehicle speed condition requiring an engine torque together with a motor torque in a preheating unavailable condition, and the engine start enable bit is generated when reaching a vehicle speed according to the vehicle condition;

wherein in the performing of the engine load operation (lock-up CH) mode, when bit=1, an engine load operation mode condition is determined by confirming a shift stage and demand power to determine a part load of the engine as a part load (PL) CH demand torque, and a part load state together with the PL CH demand torque is transmitted to the EMS;

wherein the CH environmental condition is determined as a quick drive away state or a cold quick acceleration state of a vehicle; and wherein the quick drive away state and the cold quick acceleration state are applied in a normal ambient condition of 0 to 30° C. or −7 to 35° C. and a vehicle state in which the parallel HEV/PHEV type vehicle may not travel with only the drive motor.

2. The method of claim 1, wherein the EMS and the HCU transmit and receive the bit and the commands through controller area network (CAN) communication.

3. The method of claim 1, wherein the determining of the engine start permission timing applies a lock-up CH bit according to the need of the preheating, and the lock-up CH bit is transmitted by the EMS to the HCU in a state of bit=1.

4. The method of claim 1, wherein the demand power is an engine torque to assist vehicle power all handled by a drive motor.

5. The method of claim 1, wherein the engine load operation (lock-up CH) mode command is performed by lock-up CH control in which the EMS operates the engine and fastens a clutch with the engine.

6. The method of claim 5, wherein the lock-up CH control operates the engine with the retardation of an ignition angle.

7. The method of claim 6, wherein the retardation of the ignition angle is until a time point when the clutch is locked up.

8. The method of claim 1, wherein the engine no-load operation (idle CH) mode command is performed by idle CH control in which the EMS operates the engine, and the engine idles without being fastened to the clutch.

9. A vehicle comprising:

a catalyst heating system configured to preheat an oxygen sensor provided at a front end of catalyst, wherein the catalyst heating system configured to execute the method of claim 1 includes:

an engine management system (EMS) configured to transmit a lock-up CH bit according to preheating of the oxygen sensor and an engine start enable bit according to the need of an engine torque in a catalyst heating (CH) environmental condition, and to perform an engine load operation mode command or an engine no-load operation mode command;

a hybrid control unit (HCU) configured to transmit the engine load operation (lock-up CH) mode command in which the lock-up CH bit is confirmed, and in a case of bit=1, a clutch is locked up and an engine is operated to the ESM, and to transmit the engine no-load operation (idle CH) mode command in which the engine idles in a case of being not bit=1; and controller area network (CAN) communication configured to exchange data between the ESM and the HCU.

10. The vehicle of claim 9, wherein the catalyst heating system is applied to a hybrid electric vehicle (HEV) or a plug-in hybrid electric vehicle (PHEV) in which a drive motor is arranged in the engine in parallel.

11. The vehicle of claim 9, wherein the EMS retards an ignition angle of the engine until a time point when the clutch is locked up in the engine load operation mode command.

* * * * *